United States Patent [19]

Padden et al.

[11] 4,043,500
[45] Aug. 23, 1977

[54] TUBE TO TUBE BRAZING

[75] Inventors: Thomas R. Padden, Greensburg; William J. Miller, Jr., Irwin; Rockne L. Laubham, Trafford, all of Pa.

[73] Assignee: Westinghouse Electric Corporation, Pittsburgh, Pa.

[21] Appl. No.: 674,514

[22] Filed: Apr. 7, 1976

[51] Int. Cl.² ............................................. B23K 1/04
[52] U.S. Cl. ..................................... 228/175; 228/189
[58] Field of Search ............... 228/175, 189, 183, 153; 403/384; 285/188

[56] References Cited

U.S. PATENT DOCUMENTS

| 2,053,216 | 9/1936 | Deming | 228/189 |
| 2,172,611 | 9/1939 | Gerhardt | 403/389 |
| 2,615,235 | 10/1952 | Hadley | 228/258 X |
| 2,621,075 | 12/1952 | Sedar | 285/188 X |

*Primary Examiner*—Harold D. Whitehead
*Attorney, Agent, or Firm*—L. A. DePaul; Z. L. Dermer

[57] ABSTRACT

A method of manufacturing and using a precision insert in a brazing process. An insert, manufactured to conform to the curvature of the metal members to be joined, is placed between the abutting metal members. Retaining wires are then welded to the insert and to the metal members, thereby, holding the insert in place. The braze metal is applied so that when heated the braze metal is drawn by capillary action into the space between the insert and metal members. Cooling of the assembly then results in a uniform bond.

12 Claims, 7 Drawing Figures

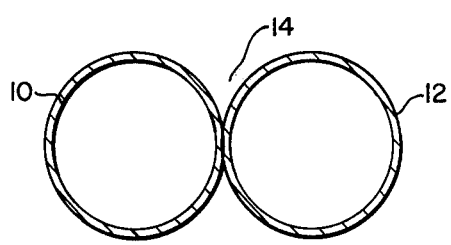
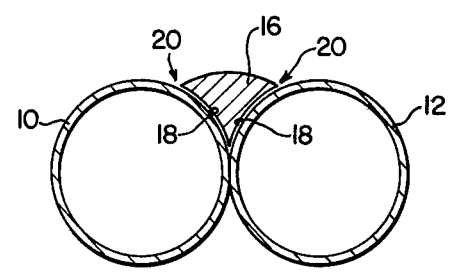
FIG.1.  FIG.2.
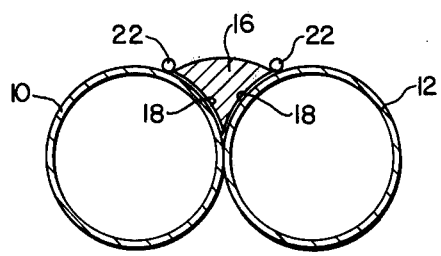
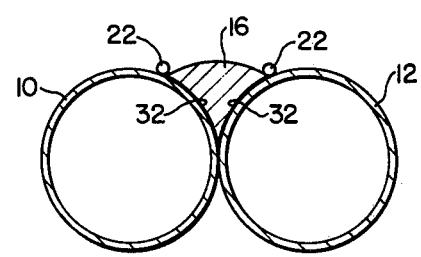
FIG.3.  FIG.5.
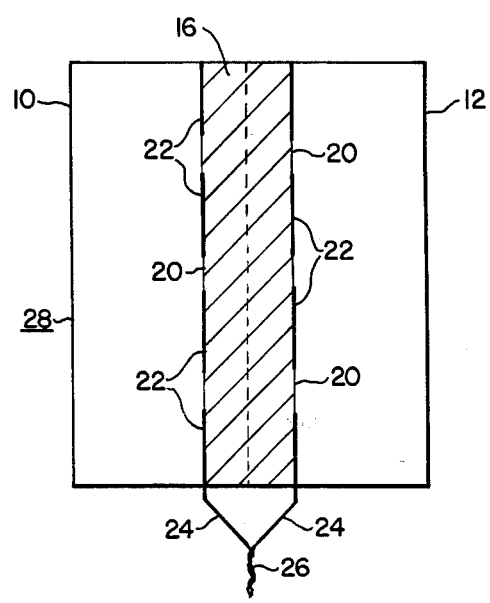
FIG.4.

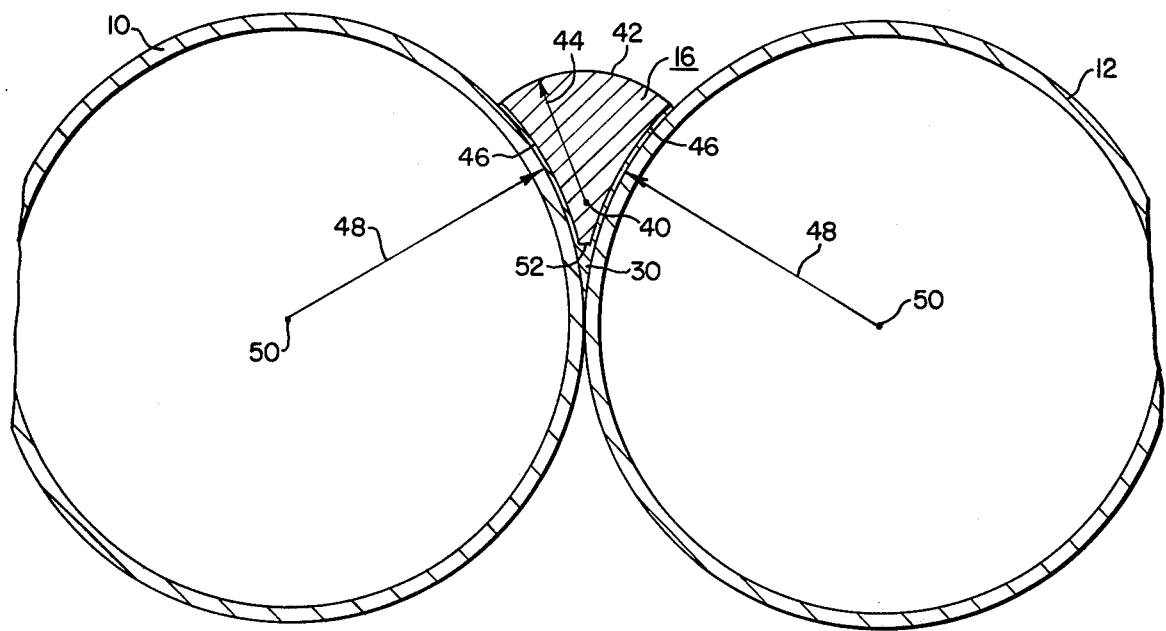
FIG. 6.
FIG. 7.
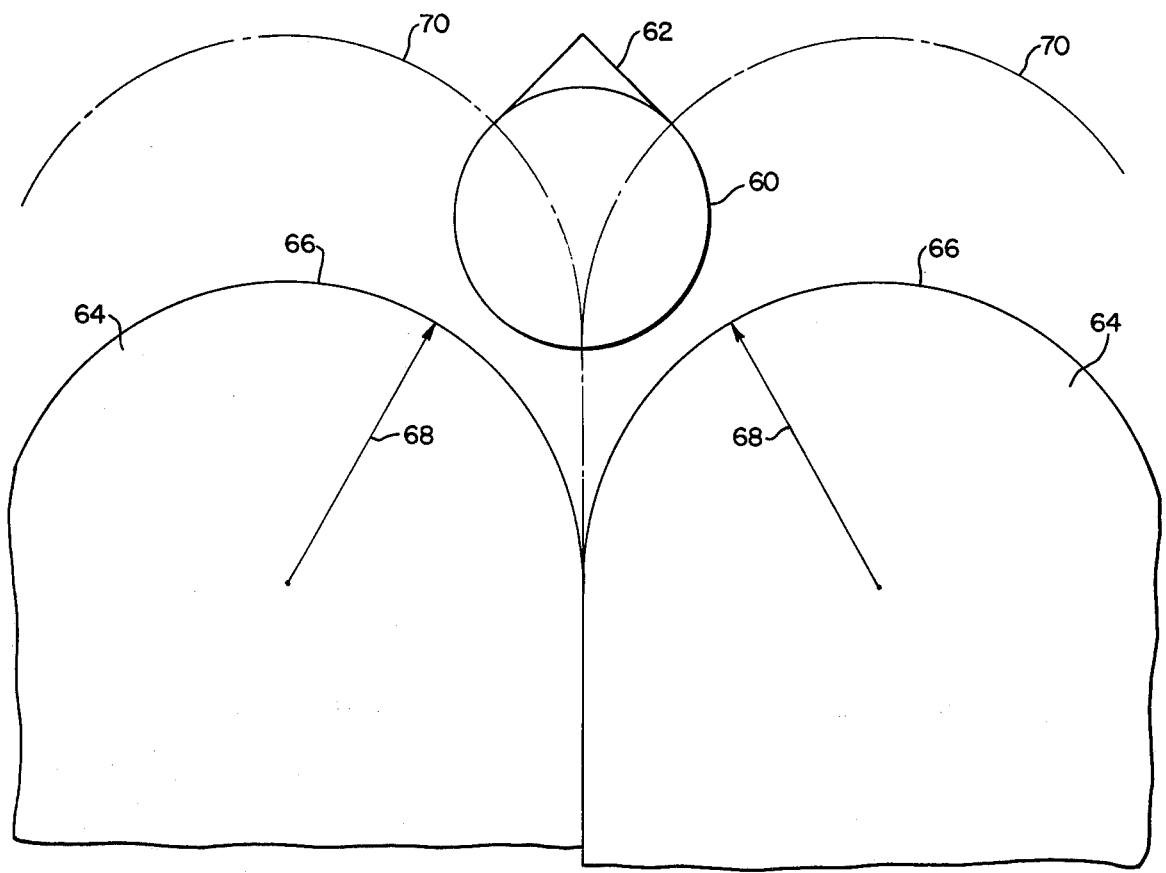

TUBE TO TUBE BRAZING

BACKGROUND OF THE INVENTION

This invention relates to the art of brazing and more particularly to a method of brazing metal members together by the use of a precision insert.

The prior art in brazing, particularly in tube to tube brazing, suffers from the specific problems of low and variable contact area along the length of abutting brazed tube joints, lack of inspectability of the brazed joints, and the presence of large braze fillets at the bottom end of the joints. The variable contact area problem arose from the practice of not having the inserts precisely conforming to the curvature of the members to be joined which resulted in a weak bond. The non-inspectability of the joints was due to the fact that once the braze inserts were in place it became extremely difficult to ascertain the closeness of the fit which also resulted in a variable contact area problem. In addition, the difficulty in determining the proper amount of braze metal to be used usually resulted in the application of an excess amount as a precautionary measure. This excess amount tended to run off the members to which it was applied thus eroding the members to be joined and creating braze fillets in inappropriate locations resulting in high stress concentrations thereby reducing the reliability of the joint.

An example of the prior art, is a tube to tube brazing process wherein at least two tubes are placed along side each other and wire inserts are tightly placed in the V-like gap along the length of the abutting tubes. These wires may be welded in place or held in position by a number of appropriate means well known in the art. A braze material is then applied to the wires and the entire assembly is heated causing the braze material to flow between the wires and the tubes. Cooling of the assembly results in the formation of a bond among the wires and tubes. In some applications due to the large size of the assemblies, the assemblies must be heated in a vertical position because only vertical furnaces are large enough to accommodate these large assemblies. In this process, experience has shown that the space between the wire inserts is too large to hold the braze metal against the force of gravity. This causes gaps of various sizes along the tubes where the braze metal flows out. Because some of these gaps are larger than others, the braze material does not uniformly fill these gaps which results in low and variable contact areas which in turn results in a poor bond. In an attempt to compensate for this deficiency, an excess amount of braze material is used in the hope of filling the gaps. However, even the use of an excess amount of braze material will not fill these gaps. Further, when a vertical furnace is used, this excess braze metal tends to run down the assembly eroding the wires and tubes and forming large braze fillets at inappropriate locations which result in high stress concentrations. In addition, the wire inserts prevent inspection of the joint.

In U.S. Pat. No. 2,182,796, to Deming, issued Dec. 12, 1939, there is described a welding process wherein the edges of the members to be joined are heated along with the heating of a filler metal so that when pressed together surface fusion produces a welded seam joining the members. The patent also describes the use of a brazing metal in this process. This patented method teaches that the process is most successful when the lateral surfaces of the filler rod are heated to such an extent as to supply an excess of molten metal which flows into and fills vacant areas between the filler rod and the members to be joined. This process exemplifies the prior art's deficiencies in producing hot flowing metal which erodes surfaces thus producing defects in the metals to be joined. This situation is unacceptable where high quality assurance levels of the metal surfaces are required. The patent to Deming also teaches that although conformity of the insert to the surfaces of the metals is desirable, it is not necessary because under enough pressure the insert when heated can be made to conform to the surfaces of the members to be joined. However, in practice the reliability of this concept, especially on vertically oriented welding processes, has proven to be suspect. This is particularly the case where the surfaces of the members to be joined are not susceptible to being beveled as the Deming patent suggests. Although the recommendation of the Deming patent that the pieces to be joined be placed a short distance apart may be advisable in some circumstances, this recommendation may not be advisable in situations where the pieces to be joined must be in contact without the aid of the joining medium.

In U.S. Pat. No. 2,719,210, to Chapman, issued Sept. 27, 1955, there is described a method of welding together thin walled tubes from a single side. This method utilizes a backing strip in conjunction with a filler rod such that when the filler rod is heated and pressure is applied to the filler rod, the filler rod is pressed against the backing strip, forming a fin which fuses with each tube. Although the patent of Chapman describes a method that may be used where there is access to both sides of the tubes, it does not solve the problem of joining such tubes where access, being limited, prohibits the use of such a backing strip. In addition, the patent suggests that if conditions are not precise, the backing strip may become bonded to the joint.

The patent to Chapman teaches that the fin thickness should be minimized which produces deficiencies in application wherein it is important to provide a joint substantially coextensive with the diameter of the tubes such as in current carrying tubes of electromagnetic pumps. In those types of applications it is important to provide a joint substantially coextensive with the tube diameter to enable a current, 4 uniform across the tube diameter, to be carried across a series of tubes. Also, the thin fin attachment does not provide a large cross-sectional attachment area which in turn results in higher stress loads on those attachments.

The Chapman patent also acknowledges that excessive heating of the tubes may result in the burning of holes in the tube wall. To circumvent this problem Chapman applies heat only to the filler rod that produces the fin attachment. However, the Chapman patent does not solve the problem of preventing defects in the tube wall where it is advantageous to heat the entire assembly.

Methods of joining tubes by the use of stamped sheet inserts are known in the prior art but these methods use direct welding of the tubes to the inserts which may produce defects in the tubes. Also, various other methods utilizing inserts of braze metal are known, but these methods do not utilize precision inserts.

SUMMARY OF THE INVENTION

A method of manufacturing and using a precision insert in joining metal members in a brazing process. A precision insert, manufactured to conform to the curvature of the metal members to be joined, is placed between the substantially abutting metal members. Retaining wires are then welded to the insert and to the metal members, thereby, holding the insert in place. The braze metal is applied so that when heated the braze metal flows by capillary action into the space between the insert and metal members. Cooling of the assembly then results in a uniform bond between the metal members.

BRIEF DESCRIPTION OF THE DRAWINGS

FIG. 1 is a sectional view of the tubular members.

FIG. 2 is a sectional view of the tubular members with insert.

FIG. 3 is a sectional view of the tubular members, insert, and retaining wires.

FIG. 4 is a plan view of the tubular members, insert, retaining wires, wicking wires, and capillary wick.

FIG. 5 is a sectional view of the assembly after being bonded.

FIG. 6 is a detail view of the insert.

FIG. 7 is a diagram illustrating the method of manufacturing the insert.

DESCRIPTION OF THE PREFERRED EMBODIMENTS

The invention pertains to a method of joining at least two metal members by the use of a precision insert. More particularly, the preferred embodiment is a method of brazing together at least two tubular members by means of a precision insert and retaining wires.

The first step in the process consists of cleaning the components in a low dew point hydrogen furnace in which the dew point is below −40° F, at 2050° F for 30 minutes. The components are then removed from the furnace and assembled in accordance with the remainder of the steps in the method.

Referring to FIG. 1, the tubular members 10 and 12 are placed in a substantially abutting parallel arrangement. To illustrate the invention only two tubes are shown; however, a multiplicity of tubes may be used in many different combinations. One example is the arrangement of tubes in an electromagnetic pump. Although it is anticipated that the tubular members 10 and 12 will be tangent to each other along their length, minor variations in the walls of the tubular members may cause this tangency to be interrupted at points. Even though these interruptions of tangency should be avoided, they can be tolerated because slight spacings will not abnormally affect the bond. When placed in this relationship, the curvature of the tubular members 10 and 12 forms a gap 14 therebetween.

To obtain a strong structural joint and uniform bond between the tubular members 10 and 12, an insert 16 of a V-like configuration substantially conforming to the gap along the abutting tubular members 10 and 12 is placed in that gap. Referring to FIG. 2, insert 16 is pressed into gap 14 forming a capillary space 18 between insert 16 and tubular member 10 and between insert 16 and tubular member 12. In the preferred embodiment, the capillary space 18 should have a width of less than 0.004 inches. However, when different metals are to be joined the width of the capillary space 18 may vary slightly from 0.004 inches. Curved spaces 20 are formed by the meeting of the top curvatures of tubular members 10 and 12 and insert 16.

Referring to FIGS. 3 and 4, the next step in the method consists of placing a series of retaining wires 22 into curved spaces 20 spacing the retaining wires apart from each other at intervals along the length of the tubular members. The retaining wires 22 are typically 1/32 inch in diameter and 2.25 inches in length. When using 2.25 inch retaining wires the interval of spacing in the series may be 0.75 inch; however, depending on the particular application various retaining wire sizes may require various spacing intervals. The intervals are provided to allow inspection of the insert fit after the retaining wires have been placed. The retaining wires 22 are then capacitance discharge spot welded to insert 16 and to the corresponding tubular member. The use of the capacitance discharge spot weld of the retainer wires 22 allows the insert 16 to be fixed in relation to the tubular members so that there will be no later movement of insert 16 relative to the tubular members 10 and 12. The use of the retaining wires and spot welds, also, prevents damage to the walls of the tubular members and to the insert because the spot weld of the retaining wires produces a smaller, less severe weld disturbance than would a direct weld of the insert to the tubular members. After the retaining wires and insert are so welded, an inspection of the alignment of the insert in relation to the tubular members can be made by sight or by a feeler gage having access to the capillary space 18 by way of the intervals between the retaining wires. If the inspection proves that the insert 16 should be realigned, the retaining wires 22 and insert 16 can easily be removed by breaking the spot welds, thus providing another advantage of the retaining wires and spot welds. The weld spots being small may be broken without significantly damaging the walls of the tubular members 10 and 12 or the insert 16.

Referring again to FIG. 4, at the bottom end of insert 16 the retaining wires 22 are extended beyond the end of insert 16 and a wicking wire 24, which may be a multistranded wire, is attached to each such extended retaining wire. As an alternative to extending the retaining wires 22, the wicking wire 24 may be spot welded to the retaining wires 22. The wicking wires 24 are then twisted together to form a capillary wick 26. The tubular members 10 and 12, the insert 16, the retaining wires 22, and the wicking wires 24 forms an assembly 28.

Next a braze metal 30 is applied to the retaining wires 22, to the intervals between the retaining wires, and to the insert 16. Proper selection of the braze metal will result in the flow of the braze metal by capillary action rather than by the force of gravity. Capillary action, which is well known in the art, is a type of surface tension effect that draws a braze metal between other properly chosen metals. Under capillary action, a braze metal may be drawn into a gap against the force of gravity thereby uniformly filling the gap. In order to utilize capillary action, a braze metal must be chosen which is compatible with the composition of the metal members to be joined. The method of proper selection is well known to those skilled in the art. For example, when the tubular members are stainless steel, the braze metal 30 may be in the form of a powder, Nicrobraz LM, with a liquid solution binder or in the form of a jell, Nicrobraz LM-S. Nicrobraz which is manufactured by Wall Colmonoy Corporation, is of a composition well known in the art. In addition, to insure a good bond the amount of braze metal applied may be in excess of that estimated to be sufficient to make the joints.

After the binder has dried the assembly 28 is placed in a low dew point hydrogen furnace in which the dew point is below −40° F in a vertical orientation and heated with the capillary wick 26 extending toward the bottom of the assembly in this orientation. The heating is accomplished in accordance with standard brazing schedules such as brazing at 2050° F for 30 minutes. During the heating the braze metal 30 is drawn by capillary action into capillary space 18 and into spaces between the tubular members caused by the non-tangency of those members filling those spaces with braze metal 30. Because the use of an excess amount of braze metal is usually desirable and because the heating is performed in a vertical orientation, a small amount of the excess may flow a short distance and fill the intervals between the retaining wires or at the bottom end run onto the capillary wick 26. Because the intervals between the retaining wires are only a short distance from each other, the excess braze does not run a great distance nor does the excess braze develop into a large droplet. This arrangement prevents the excess braze metal from eroding the insert or the tubular members. The assembly is then allowed to cool so that a firm bond 32 is achieved among the insert and the tubular members as shown in FIG. 5. Once cooled, the excess braze metal deposited on the capillary wick 26 may be clipped off leaving a smooth braze joints thus eliminating braze fillets which could cause stress concentration. The joints are then inspected for general appearance. If for any reason there was not sufficient braze metal present, a cosmetic brazing run may be made.

Referring to FIG. 6, the insert 16 has a reference point 40. The outer edge 42 of the insert 16 has a curvature defined by a radius 44 whose center is reference point 40. The length of radius 44 is determined by the size of stock from which the insert is manufactured. Sides 46 of insert 16 have a curvature defined by radii 48 with radii 48 having centers 50. Centers 50 are separated from each other by a distance twice the length of radii 48. Centers 50 are also located so as to be coincident with the centers of the tubular members 10 and 12. Side 52 of insert 16 although being independent of the diameters of the tubular members 10 and 12, preferably has a length of about 0.004 inch. Testing of this insert in the method herein described showed that when the length of side 52 was about 0.004 inches that capillary space 18 and the volume between side 52 and the point of tangency of the tubes was filled with braze metal 30 solely by capillary action and that when the length of side 52 appreciably exceeded 0.007 inches the volume between side 52 and the point of tangency of the tubes was filled by gravity. If the capillary space is filled by gravity, when the brazing is done in the vertical orientation, the top joints will not be evenly filled while the bottom joints will be overly filled resulting in a non-uniform bond. Filling of the capillary space solely by capillary action results in a uniform bond which is, thereby, a stronger bond.

The method of manufacturing the insert 16 consists of placing a cylindrical piece of stock 60 in a holder 62 as shown in FIG. 7. Two ganged cutters 64 having convex cutting edges 66 with radii of curvature 68 are placed in front of the holder 62. Radii 68 have a length equal to that of radii 48. The ganged cutters are moved forward cutting stock 60 along lines 70. Lines 70, thereby, become congruent with sides 46 of insert 16.

While there is described what is now considered to be the preferred embodiment of the invention, it is, of course, understood that various other modifications and variations will occur to those skilled in the art. The claims, therefore, are intended to include all such modifications and variations which fall within the true spirit and scope of the present invention. For example, the insert used in the method may be of a different configuration, due to the curvature of the members to be joined, while embodying the same principles as herein described. Also, the braze metal may be a metal other than Nicrobraz. In addition, a series of wicking wires which may be spaced at 2.5 ft. intervals along the assembly may be used rather than a single pair as described above. Furthermore, a particular application of the invention may omit the use of retaining wires.

We claim as our invention:

1. A method of joining metals comprising:
    abutting a first curved metal member to a second curved metal member, the curvature of said metal members forming a gap along the interface of said metal members;
    placing in said gap an insert having surfaces complementary to surfaces of said metal members;
    spacing said insert from the metal members a distance sufficiently small to establish a capillary space therebetween;
    bonding said insert to said metal members at intervals along the metal members' length thus maintaining the capillary space;
    applying braze metal compatible with said insert and said metal members to said insert and said metal members;
    heating said braze metal causing said braze metal to flow into said capillary space; and
    cooling said braze metal below the solidus temperature of said braze metal to thereby bond the insert and metal members into a strong cohesive assembly.

2. The method recited in claim 1 wherein the step of applying a braze metal includes applying a powder alloy.

3. The method recited in claim 1 including the step of: heating said assembly in a hydrogen furnace.

4. The method recited in claim 3 including the step of: heating said assembly for 30 minutes at a temperature of about 2050° F in a hydrogen furnace in which the dew point is below approximately −40° F.

5. The method recited in claim 1 including the steps of:
    bonding at predetermined intervals a series of retaining members to said first metal member and to said insert forming a series of first joints; and
    bonding at predetermined intervals a series of retaining members to said second metal member and to said insert forming a series of second joints.

6. The method recited in claim 5 including the step of: applying a braze metal to said series of first joints and to said series of second joints.

7. The method recited in claim 1 including the steps of:
    attaching a first wicking wire to said first metal member and to said insert;
    attaching a second wicking wire to said second metal member and to said insert, said first and second wicking wires forming a pair of adjacent wicking wires; and
    twisting said pair of wicking wires together forming a capillary wick for stopping the excess flow of said braze metal in a position facilitating the removal of the solidified excess of said braze metal.

8. A method of joining tubular members comprising:
    abutting a first tubular member to a second tubular member, the curvature of said tubular members forming a gap along the interface of said tubular members;

placing in said gap an insert having surfaces complementary to surfaces of said tubular members;

spacing said insert from said tubular members a distance sufficiently small to establish a capillary space therebetween;

bonding at predetermined intervals a series of retaining members to said first tubular member and to said insert forming a series of first joints;

bonding at predetermined intervals a series of retaining members to said second tubular member and to said insert forming a series of second joints;

applying braze metal to said joints;

heating said braze metal causing said braze metal to flow into said capillary space; and cooling said braze metal below the solidus temperature of said braze metal to thereby bond said insert and said tubular members into a strong cohesive assembly.

9. The method recited in claim 8 including the steps of:

extending said retaining members beyond the end of said insert;

attaching a wicking wire to said extended retaining members forming a pair of adjacent wicking wires; and twisting said pair of wicking wires together forming a capillary wick for stopping the excess flow of said braze metal in a position facilitating the removal of the solidified excess of said braze metal.

10. The method recited in claim 8 including the steps of:

applying a powder alloy as a braze metal.

11. The method recited in claim 8 including the steps of:

heating said assembly in a hydrogen furnace.

12. The method recited in claim 11 including the step of:

heating said assembly for 30 minutes at a temperature of about 2050° F in a hydrogen furnace in which the dew point is below approximately −40° F.

* * * * *